(12) United States Patent
Loce et al.

(10) Patent No.: US 6,757,431 B2
(45) Date of Patent: Jun. 29, 2004

(54) RESOLUTION CONVERSION FOR ANTI-ALIASED IMAGES USING LOOSE GRAY SCALE TEMPLATE MATCHING

(75) Inventors: Robert P. Loce, Webster, NY (US); John C. Handley, Fairport, NY (US); Clara Cuciurean-Zapan, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 238 days.

(21) Appl. No.: 09/740,607

(22) Filed: Dec. 19, 2000

(65) Prior Publication Data

US 2002/0076120 A1 Jun. 20, 2002

(51) Int. Cl.[7] .............................. G06K 9/62; G06K 9/64; G06K 9/68; G06K 9/40
(52) U.S. Cl. ...................... 382/209; 382/217; 382/218; 382/219; 382/220; 382/269
(58) Field of Search ................................ 382/205, 209, 382/217, 218, 219, 220, 221, 270, 266, 269

(56) References Cited

U.S. PATENT DOCUMENTS

| | | |
|---|---|---|
| 4,437,122 A | 3/1984 | Walsh et al. |
| 4,544,264 A | 10/1985 | Bassetti et al. |
| 4,646,355 A | 2/1987 | Petrick et al. |
| 4,791,679 A | 12/1988 | Barski et al. |
| 4,847,641 A | 7/1989 | Tung |
| 5,005,139 A | 4/1991 | Tung |
| 5,079,123 A | 1/1992 | Nanya et al. |
| 5,134,495 A | 7/1992 | Frazier et al. |
| 5,193,008 A | 3/1993 | Frazier et al. |
| 5,237,646 A | 8/1993 | Bunce |
| 5,265,176 A | 11/1993 | Miller |
| 5,282,057 A | 1/1994 | Mailloux et al. |
| 5,329,599 A * | 7/1994 | Curry et al. ................. 382/266 |
| 5,365,251 A | 11/1994 | Denber |
| 5,365,596 A * | 11/1994 | Dante et al. ................. 382/141 |
| 5,367,578 A * | 11/1994 | Golem et al. ................ 382/183 |
| 5,387,985 A | 2/1995 | Loce et al. |
| 5,579,445 A * | 11/1996 | Loce et al. .................. 358/1.2 |
| 5,696,845 A | 12/1997 | Loce et al. |

(List continued on next page.)

OTHER PUBLICATIONS

Franklin C. Crow, University of Texas, Austin, TX; The Use of Grayscale For Improved Raster Display of Vectors and Characters; pp. 1–5.

(List continued on next page.)

*Primary Examiner*—Samir Ahmed
*Assistant Examiner*—Brian Le

(57) ABSTRACT

A method for resolution conversion for re-sampling anti-aliased images is disclosed which decreases bandwidth costs associated with anti-aliased line art and other costs associated with interpolating these images to a desired resolution. The present method first involving the receipt of an image which is comprised of bitmap data including at least a plurality of gray-scale pixel tiles that define the image. Then receiving the image data at a first resolution and extracting pixel tile information of the received image at a second resolution. The method has the step of next using loose gray scale template matching on each of the pixel tile information with at least one of a plurality of templates so as to generate pixel-wise looseness interval values there between. Then, outputting a portion of the enhanced pixel tile information wherein the enhanced pixel tile information is formed by a matching of a template with pixel-wise looseness values. Preferably, the input and output resolutions are at different integer values and the first and second resolutions have a non-integer ratio. The input image can also preferably be comprised of gray halftones and the output enhanced pixel tile can be formed of binary pixel data.

8 Claims, 12 Drawing Sheets

U.S. PATENT DOCUMENTS

| | | | | |
|---|---|---|---|---|
| 5,742,703 | A | | 4/1998 | Lin et al. |
| 5,805,721 | A | * | 9/1998 | Vuylsteke et al. ........... 382/128 |
| 5,835,129 | A | * | 11/1998 | Kumar ..................... 348/14.09 |
| 5,982,945 | A | * | 11/1999 | Neff et al. ................... 382/271 |
| 6,130,660 | A | * | 10/2000 | Imsand ....................... 345/698 |
| 6,381,372 | B1 | * | 4/2002 | Loce .......................... 382/261 |
| 6,389,163 | B1 | * | 5/2002 | Jodoin et al. ................ 382/173 |
| 6,449,396 | B1 | * | 9/2002 | Loce et al. .................. 382/276 |
| 6,683,702 | B1 | * | 1/2004 | Loce et al. ................. 358/3.09 |

OTHER PUBLICATIONS

Charles Tung, Hewlitt–Packard Laboratories, Palo Alto, CA 94304; Charles Tung, "Resolution Enhancement Technology in Hewlett–Packard Laser Jet Printers," Proc. SPIE 1912, Colo.

J.R. Sanders, W.Hanson, M.Burke, R.S.Foresman, J.P. Fleming; Behind HP's Patent on RET, B.Colgen ed.; Prepared by Torrey Pines Research; c. 1990 pp. 167–169.

Douglas N. Curry, Xerox Palo Alto Research Center, Electronics and Imaging Laboratory. Palo Alto, CA 94304–1214, Hyperacuity laser image; JEI/Apr. 1993/Vol2(2) pp. 138–146.

Adam L. Carley, Ph.D; Resolution Enhancement in Laser Printers; c. 1993 XLI Corporation, Woburn, MA; pp. 1–17.

Robert E. Coward; Area Mapping Table Look Up Scheme; Xerox Disclosure Journal—vol. 18, No. 2 Mar./Apr. 1993; pp. 217–221.

Henry R. Kang and Robert E. Coward; Area Mapping Approach for Resolution Conversion; Xerox Disclosure Journal—vol. 19, No. 2 Mar./Apr. 1994; pp. 173–172.

J.C. Handley; E.R. Dougherty; Model–based optimal restoration of fax images in the context of mathematical morphology;Journal of Electronic Imaging/ Apr. 1994/vol. 3(2) p 182–189.

E.R. Dougherty; D. Sinha; Computational Gray–scale Mathematical Morphology on Lattices; Real–Time Imaging 1, 69085 (1995);c. 1995 Academic Press Limited.

R. Loce; E. Dougherty;Enhancement and Restoration of Digital Documents; SPIE Press, Bellingham, WA, 1997. Chapters 1–4.

* cited by examiner

FIG. 2B
PRIOR ART

RESOLUTION CONVERSION FOR ANTI-ALIASED IMAGES USING LOOSE GRAY SCALE TEMPLATE MATCHING

RELATED APPLICATIONS

The present application is related co-pending U.S. application Ser. No. 09/505,875 entitled "LOOSE-GRAY-SCALE TEMPLATE MATCHING", filed Feb. 17, 2000 and is related to co-pending U.S. application Ser. No. 09/740,467 entitled "DOCUMENT IMAGE SEGMENTATION USING LOOSE GRAY SCALE TEMPLATE MATCHING", filed concurrently herewith.

FIELD OF INVENTION

This invention relates to systems and methods for processing images using filters. More specifically, this invention relates to systems and methods for designing and implementing image processing filters using templates wherein the filters operate on gray-scale images and the templates identify gray-scale image features for the purposes of modification or for extracting some image statistic, and for the purposes of optimization for the human visual system, or compatibility with other system modules, such as, compression algorithms, recognition algorithms and those occurring in printing and display devices.

CROSS REFERENCES

The following patents and publications are hereby incorporated by reference for their teachings:

"Method for design and implementations of an image resolution enhancement system that employs statistically generated lookup tables," Loce et al., U.S. Pat. No. 5,696,845;

"Method and apparatus for the resolution enhancement of grayscale images that include text and line art", Lin et al., U.S. Pat. No. 5,742,703.

Barski, L., and R. Gaborski, "Image Character Enhancement using a Stroke Strengthening Kernel," U.S. Pat. No. 4,791,679, Dec. 13, 1988.

Bassetti, L. W., "Fine Line Enhancement," U.S. Pat. No. 4,544,264, Oct. 1, 1985.

Bunce, R., "Pixel Image Enhancement Employing a Reduced Template Memory Store," U.S. Pat. No. 5,237,646, Aug. 17, 1993.

Carely, A. L., "Resolution Enhancement in Laser Printers," Copyright 1993, XLI Corp., Woburn, Mass.

Crow, F. C., "The Use of Gray-scale for Improved Raster Display of Vectors and Characters," *Computer Graphics*, Vol. 12, Aug., 1978.

Curry, D. N., "Hyperacuity Laser Imager," *Journal of Electronic Imaging*, Vol. 2, No. 2, pp 138–146, Apr. 1993.

Curry, D. N., R. St. John, and S. Filshtinsky, "Enhanced Fidelity Reproduction of Images by Hierarchical Template Matching," U.S. Pat. No. 5,329,599, Jul. 12, 1994.

Denber, M., "Image Quality Improvement by Hierarchical Pattern Matching with Variable Size Templates," U.S. Pat. No. 5,365,251, Nov. 15, 1994.

Frazier, A. L., and J. S. Pierson, "Resolution Transforming Raster-Based Imaging System," U.S. Pat. No. 5,134,495, Jul. 28, 1992.

Frazier, A. L., and J. S. Pierson, "Interleaving Vertical Pixels in Raster-Based Laser Printers," U.S. Pat. No. 5,193,008, Mar. 9, 1993.

Handley, J., and E. R. Dougherty, "Model-Based Optimal Restoration of Fax Images in the Context of Mathematical Morphology, *Journal of Electronic Imaging*, Vol. 3, No. 2, April 1994.

Kang, H., and R. Coward, "Area Mapping Approach for Resolution Conversion," *Xerox Disclosure Journal*, Vol. 19, No. 2, March/April, 1994.

Loce, R. and E. Dougherty, *Enhancement and Restoration of Digital Documents*, SPIE Press, Bellingham Wash., 1997. Chapters 1–4.

Loce, R. P., M. S. Cianciosi, and R. V. Klassen, "Non-Integer Image Resolution Conversion Using Statistically Generated Look-Up Tables," U.S. Pat. No. 5,387,985, Feb. 7, 1995.

Mailloux, L. D., and R. E. Coward, "Bit-Map Image Resolution Converter," U.S. Pat. No. 5,282,057, Jan. 25, 1994.

Miller, S., "Method and Apparatus for Mapping Printer Resolution Using Look-up Tables," U.S. Pat. No. 5,265,176, Nov. 23, 1993.

Petrick, B., and P. Wingfield, "Method and Apparatus for Input Picture Enhancement by Removal of Undesired Dots and Voids." U.S. Pat. No. 4,646,355, Feb. 24, 1987.

Sanders, J. R., W. Hanson, M. Burke, R. S. Foresman, J. P. Fleming, "Behind Hewlett-Packard's Patent on Resolution Enhancement® Technology," B. Colgan, ed., Prepared by Torrey Pines Research Carlsbad Calif., Distributed by BIS CAP International, Newtonville Mass., 1990. [Discusses early template matching patents—Tung, Walsh, Basseti, . . . ]

Tung, C., "Piece-Wise Print Image Enhancement for Dot Matrix Printers," U.S. Pat. No. 4,847,641, Jul. 11, 1989, U.S. Pat. No. 5,005,139, Apr. 2, 1991.

Tung, C., "Resolution Enhancement in Laser Printers," in Proc. SPIE 1912, *Color Hard Copy and Graphics Arts II*, Jan. 31, 1993, San Jose, Calif.

Walsh, B., F., and D. E. Halpert, "Low Resolution Raster Images," U.S. Pat. No. 4,437,122, Mar. 13, 1984.

DESCRIPTION OF RELATED ART

A wide variety of digital document processing tasks are performed using template-based filters. Illustratively, digital document processing tasks include resolution conversion, enhancement, restoration, appearance tuning and de-screening of images. These tasks are commonly performed on monochrome and color images, as well as binary and continuous tone images. Although, due to the binary nature of conventional templates, implementing many digital document-processing tasks on continuous tone images has been problematic prior to the present invention. A continuous tone image may also be referred to as a gray-scale image.

In conventional systems and methods, a typical filter includes template operators to perform filtering of the images, where, a filter may be characterized as an operator or device that transforms one image into another image or transforms an image to a collection of information, such as image statistics. The filter is formed of a number of imaging template operators, often simply referred to as templates. These templates may be, for example, stored in a look-up table and implemented using a look-up table formalism. Or other equivalent formalisms, such as Boolean logic may be employed. The number of templates in a filter may vary between a small number of templates to thousands of templates. Due to its versatility in design, a look-up table is typically used to implement a template-based filter.

A raster is a one-dimensional array of image data, reflecting a single line of data across a single dimension, i.e., the length or the width, of the image. Further, each location, or "picture element," in an image may be called a "pixel." In an array defining an image in which each item of data provides a value, each value indicating the properties of a location may be called a pixel value. Each pixel value is a bit in a binary form of an image, a gray-scale value in a gray-scale form of an image, or a set of color-spaced coordinates in a color coordinate form of an image. The binary form, gray-scale form, and color coordinate form are each arranged typically in a two-dimensional array, which defines an image. An N-dimensional array is typically used for an N-dimensional images, where for example, N=3 for 3-dimensional topographic images.

Using the typical binary image processing setting as an example, the filter, using the templates, transforms certain observed pixel patterns in a binary image, for example, into a corresponding enhanced binary pixel pattern. Specifically, the filter observes an arrangement of pixels using a suitable window or mask. A window is an imaging algorithmic device that observes a plurality of pixels at the same time, where the plurality of pixels is located about a target pixel. The values and locations of the observed pixels are inputted into the template matching operations. After observing the arrangement of pixels, about a target pixel, the filter then attempts to match the observed pixel pattern with one or more of the templates in the look-up table. If the look-up table contains a match to the observed pixel pattern, the look-up table generates an appropriate output. The output may be an enhanced pixel pattern for the target pixel that corresponds to the observed pixel pattern. The output could also be information in other forms; for example, the output could be a code denoting the match condition, or a data to be used for a statistical characterization of image regions.

A wide variety of types and sizes of observation windows or masks are known. The particular window used in a particular application depends on the image to be analyzed and the particular process to be performed on the image. Illustratively, a 3×3 window may be used to process an image. The 3×3 window, at various locations in the image, observes a 3×3 block, i.e., a 9-pixel block, of binary-valued pixels, for example. One pixel in the window is the target pixel, which is typically the center pixel, while the other pixels in the window are the neighboring pixels. The target pixel and the neighboring pixels form a neighborhood. The window is typically scanned across an image advancing from target pixel to target pixel.

After the neighborhood is observed in the window, the neighborhood is then processed in some manner. For example, the observed neighborhood may be transformed into a vector. The vector is expressed in the form of $(x_1, x_2 \ldots x_N)$ where Ni is the number of pixels in the neighborhood and is used to represent the properties of the target pixel, including the neighborhood of the target pixel. Each element of the vector represents one of the pixels observed in the window. The vector is then used in the look-up table to generate a desired output, for example.

A look-up table may be created in a wide variety of ways. Typically, an input value is input into the look-up table and, in response, the look-up table outputs an output value. Further, the look-up table is typically created using a training image or a set of training images. "Restoration and Enhancement of Digital Documents," by R. Loce and E. Dougherty, teaches a variety of methods for designing templates based on sets of training images. The training images will occur in pairs, where one member is the "typically input image," or the "typically observed image," i.e., the "observed image," and the other image is the "ideal desired processed version of the image," i.e., the "ideal image." The training image pairs may be input into a computer program that acquires and analyzes pattern statistics between the two images, i.e., using computer-aided filter design techniques.

Conventional computer-aided filter design may be accomplished through using training-sets of document bitmaps, for example.

Illustratively, for designing a filter that enhances from a binary state to a gray-scale state, for a given pattern that occurs in the binary image about a target pixel, a training analysis system examines a target pixel at that corresponding location in the gray-scale image. The center of the window may be placed at the target pixel, for example. Based on the set of gray-scale pixels in the gray-scale image that are associated with corresponding target pixels in the binary image and gray-scale image, and associated with a similar neighborhood pixel pattern, a "best gray-scale pixel value" is determined for processing a target pixel that possess that pattern of neighborhood pixels. In other words, a template is created for the target pixels in the binary image possessing similar neighborhood pixel patterns. This analysis is performed for all binary patterns that are significant.

In this process of template selection, significance may be due to attributes such as the pixel pattern's frequency of occurrence, the pattern's effect on the generated image, or both. Accordingly, if a template, i.e., a pattern of pixels in the binary image, is considered significant with respect to template inclusion in the design process, that template will appear in the template-matching filter. Upon operating on an input image, if that pattern is observed, the observed target pixel value will be assigned or associated with a certain value, i.e., a corresponding gray-scale value. Both the observed neighborhood and the corresponding gray-scale value may be stored in the look-up table. Accordingly, the look-up table accepts input values and outputs a desired corresponding output value, i.e., maps input values to an ideal corresponding output value.

However, it should be apparent that this input/output process may be performed in various other ways without using a look-up table. One alternative approach that is equivalent to using a look-up table representation is a Boolean logic representation. In the Boolean logic representation, pixel values are used as variables in the logic architecture, such as a logical sum of products. The goal of template filter design using Boolean logic representation is to derive optimized Boolean operators, preferably statistically optimized Boolean operators.

As illustrated in FIG. 1 there is shown the basic process for template matching based on an observed image. Initially an observed image will occur (10) from which an ideal image is warranted (15). In order to generate an image as close as possible to the ideal image, a generated image (25) is created by utilizing a template matching operation (20). With the above understanding of the image processing setting we see that it is greatly desired to produce a generated image as similar as possible to the ideal image.

The conventional template matching operation is a binary matching process whereby a binary template or filter is to applied to a binary image.

For example, as illustrated in FIG. 2A a binary image (50) is initially sent to a data buffering circuit (55). After which, a binary pattern matching operation (60) is performed. Binary templates are typically defined as possessing ones, zeros, and "don't cares." With reference to FIG. 2B there is shown a typical binary matching template structure. For example, the binary templates in this example are defined with ones and X's for use in the binary matching step, where "X" denotes "don't care". After combining the buffered image data and the templates in the binary pattern matching operation (60), an enhanced data buffering step (65) to create the enhanced image (70) is exercised.

Illustrated in FIGS. 4A, 4B, and 4C is the set of images associated with an image restoration application using a filter defined by templates representing particular Boolean functions applied to a received image. FIG. 3A shows a representation of a 3×3 window and the positions of pixels ($x_1, \ldots, x_9$). The filter defined by this window and the templates of FIG. 2B possesses the Boolean function representation shown in FIG. 3B as follows:

$$y = f(x_1, x_2, \ldots, x_9) = x_5 + x_4 x_6 + x_1 x_9 + x_2 x_8 + x_3 x_7 \quad (1)$$

When employed as a translation-invariant filter, the singleton template $x_5$ behaves as an identity operator: whatever pixels are valued one and zero in the input image are valued one and zero in the output image, respectively. OR'ed onto that identity image is the result of each 2-pixel logical product. The templates corresponding to those products possess structures that straddle the origin pixel. In this configuration a template can "fit", or yield a 1, when positioned about a hole or break in a character stroke. Equation 1 is an example of an image processing operator that can be employed to repair breaks in character strokes within an image. FIG. 4 is an example of applying Equation 1 as a filter operating on an image, where FIG. 4A shows an ideal image, 4B shows an input image, and 4C shows the image resulting from applying Equation 1 as a filter to the image of FIG. 4B., The filter defined by Equation 1 produced a character (120) more likely to be recognized in character recognition operation. The restoration is not perfect. A more complicated (more and different products) filter could achieve better restoration. As shown in FIG. 4A and FIG. 4C there are still differences between the ideal image 100 and the generated image 120 resulting from the use of the filtering process defined by Equation 1.

As illustrated in FIG. 5A a system of the prior art is shown where an input image 150 is processed by a process 165 that includes binary-template-based filters 160 and combinatorial logic 170 [changed t to match the figure]; from which an output image 175 is generated and subsequently sent to a digital printer, high resolution printer or high resolution display 180.

SUMMARY OF THE INVENTION

A method for resolution conversion for re-sampling anti-aliased images is disclosed which decreases bandwidth costs associated with anti-aliased line art and other costs associated with interpolating these images to a desired resolution. The present method first involving the receipt of an image which is comprised of bitmap data including at least a plurality of gray-scale pixel tiles that define the image. Then receiving the image data at a first resolution and extracting pixel tile information of the received image at a second resolution. The method has the step of next using loose gray scale template matching on each of the pixel tile information with at least one of a plurality of templates so as to generate pixel-wise looseness interval values there between. Then, outputting a portion of the enhanced pixel tile information wherein the enhanced pixel tile information is formed by a matching of a template with pixel-wise looseness values. Preferably, the input and output resolutions are at different integer values and the first and second resolutions have a non-integer ratio. The input image can also preferably be comprised of gray halftones and the output enhanced pixel tile can be formed of binary pixel data.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which:

Figure 2B:
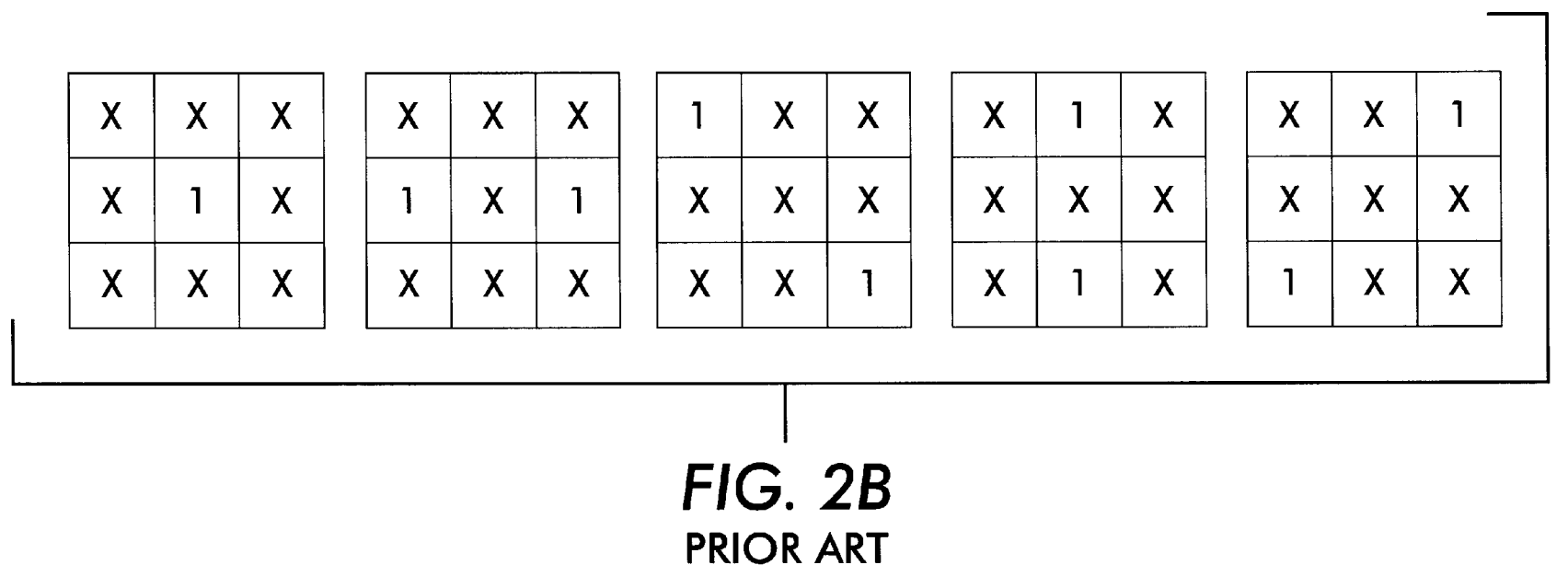

FIG. 2B shows a diagram of an example of a series of templates used in a binary matching template arrangement;

DESCRIPTION OF THE PREFERRED EMBODIMENT

Figure 1:
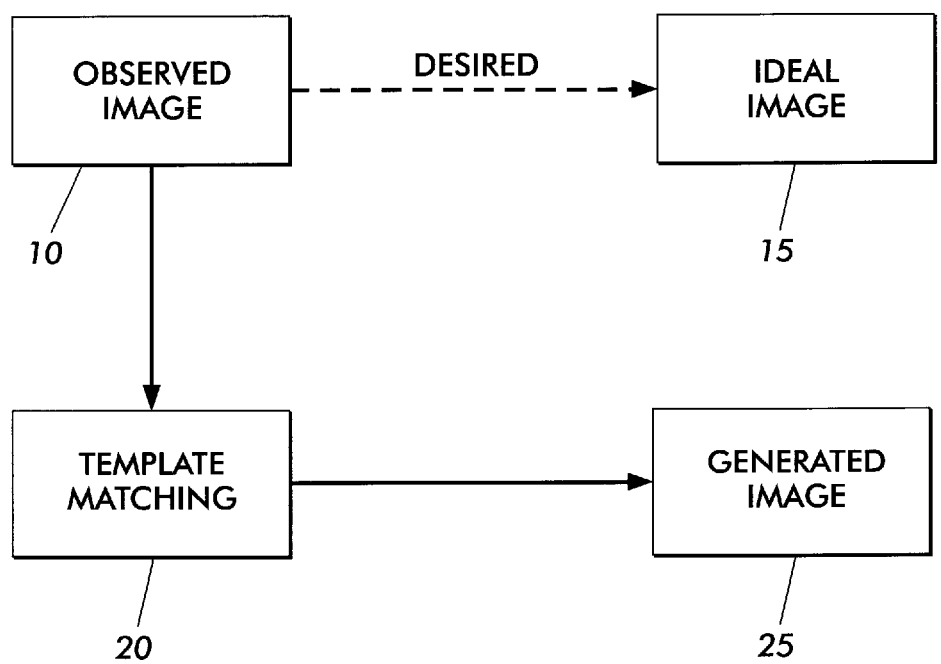
FIG. 1 is a diagram illustrating a conventional template matching filter paradigm.
Figure 2A:
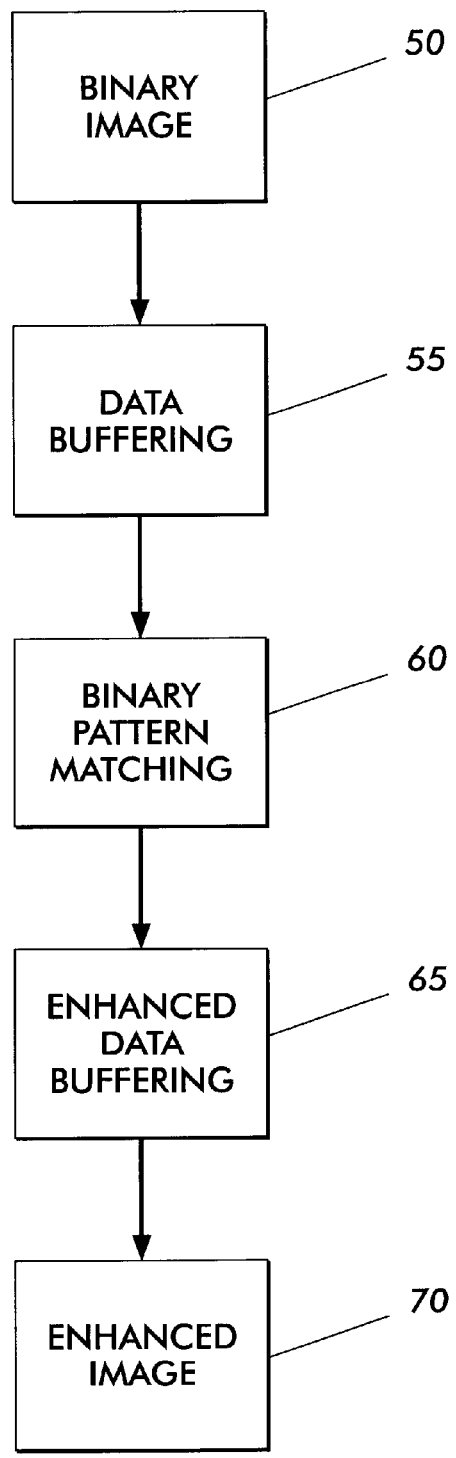
FIG. 2A shows a flowchart of a conventional binary template matching arrangement.
Figures 3A, 3B:
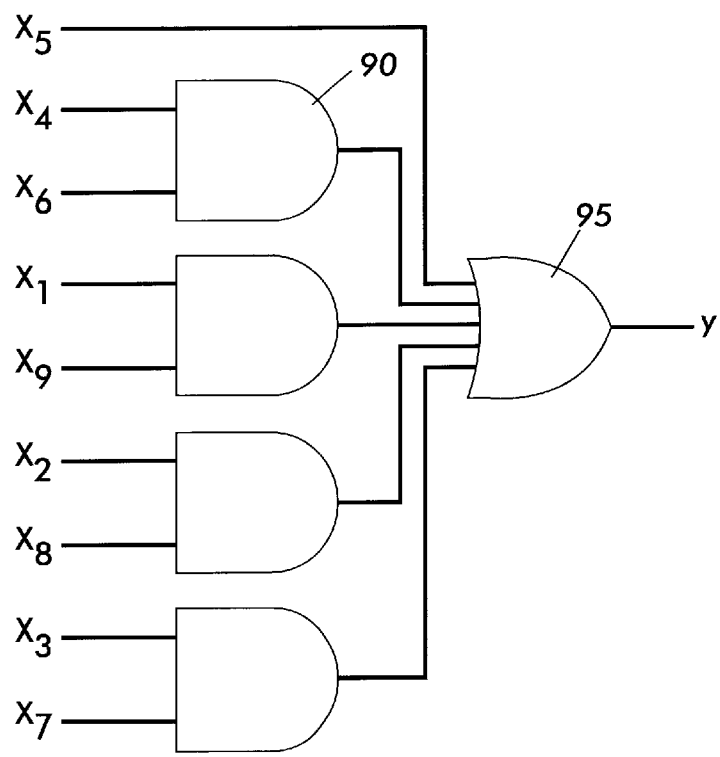
FIG. 3A shows a representation of a 3×3 window and the positions of pixels ($x_1, \ldots, x_9$)
FIG. 3B shows a diagram of a gate structure of the template matching operation for the templates of the example in FIG. 3A.
Figure 4A:
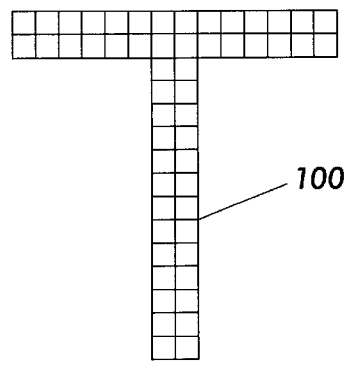
FIGS. 4A–C show a series of diagrams of an example of an ideal image, an observed image with holes and breaks and an image resulting from a template matching operation on the observed image.
Figure 4B:
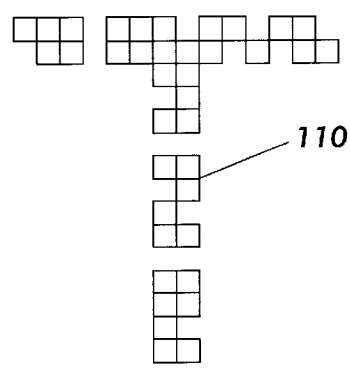
Figure 4C:
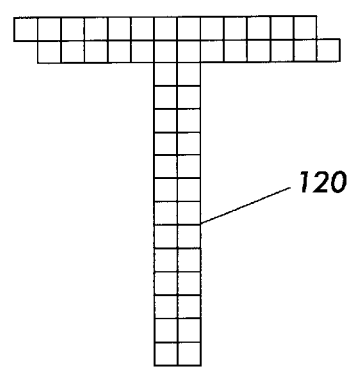

The term "bitmap" refers herein to a digital image quantized in a variety of forms, such as binary, 8 bits/pixel, or some intermediate number of bits/pixel, or some high resolution quantization state.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of $2^N$ possible values.

The term "data" includes data existing in any physical form, and includes data that are transitory or are being stored or transmitted. For example, data could exist as electrical, electromagnetic or other transmitted signals or as signals stored in electronic, magnetic, or other form. The terms image signal, video data, and pixel are interchangeably used herein to describe discrete digital signals that represent the active (on) or inactive (off) state of an element within a digital image. In addition, shaded or crosshatched portions of image bitmaps depicted herein are intended to represent black or active pixels (having a value of 1 in a binary representation) within the bitmaps. Such a representation is not intended to limit the present invention, but to simplify the description thereof. Accordingly, the present invention may be operated in the same manner by substituting white pixel states wherever black pixels are indicated, and vice versa.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location. An example of a circuit is a data or address bus in an electromechanical system such as a printing system or computer.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

A "data processing system" is a physical system that processes data. An "image processing system" is a data processing system that processes image data. A "data processor" or "processor" is any component or system that can process data, and may include one or more central processing units or other processing components.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

"Control circuitry" is circuitry that provides data or other signals that determine how other components operate. For example, "instruction circuitry" is control circuitry that provides items of data indicating instructions to a component that includes processing circuitry. Similarly, "addressing circuitry" is control circuitry that provides items of data indicating addresses to a component that includes memory circuitry.

Control circuitry provides signals that "control" transfer of data by bus circuitry if the signals determine sources and destinations of the transfers of data by the bus circuitry. For example, the control circuitry could provide signals to a source so that it provides an item of data to the bus circuitry; the control circuitry could also provide signals to one or more destinations so that they receive the item of data from the bus circuitry.

An "image" may include characters, words, and text as well as other features such as graphics. A text may be included in a set of one or more images, such as in images of the pages of a document. An image may be divided into "segments," each of which is itself an image. A segment of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image.

Each location in an image may be called a "pixel." Hence, a "pixel" is the smallest segment into which an image is divided or accessed in a given system. In an array defining an image in which each item of data provides a value, each value indicating the color of a location may be called a "pixel value". Each pixel value is, for example, a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. The invention will hereafter be described in terms of a single-color gray-scale embodiment, however, there is no intent to limit the invention to such a single-color system as it has application to multicolor systems as well.

An item of data "relates to" part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

An operation performs "image processing" when it operates on an item of data that relates to part of an image.

Pixels are "neighbors" or "neighboring" within an image when there are no other pixels between them or they meet an appropriate criterion for neighboring. If, for example, the pixels using adjoining criteria are rectangular and appear in rows and columns, each pixel may have 4 or 8 adjoining neighboring pixels, depending on the criterion used.

The "looseness interval" of the present invention is a measure of the difference between a template and an observed neighborhood of pixels. Each pixel can possess a looseness interval and a template and neighborhood can possess an overall looseness interval. In the pixel-wise case, the looseness interval could be a simple metric, such as the absolute value of the difference between an observed pixel value and a template value. More complicated intervals may also be defined, such as intervals that are dependent upon the sign of the difference, or are a function of the difference. The function may be arithmetic, such as multiplication by a factor, algebraic, such as being raised to a power, or some other algorithmic means to represent a degree of difference between the observed neighborhood of pixels and the template. An overall template looseness interval could be a combination of the pixel looseness intervals, or it could be a function directly applied to the observed pixel neighborhood and template, where that function provides a degree of difference. Example of the overall template looseness interval are averaging of at least a portion of the pixel looseness interval, and taking the maximum of the pixel looseness intervals. In this patent specification we often use looseness interval to denote either or both a pixel looseness interval and an overall template looseness interval.

The "threshold looseness interval" is the maximum allowable value for the looseness interval that indicates a loose-fitting match. As with the definition of looseness interval, threshold looseness interval may be defined pixel-wise or overall-template-wise.

Figure 5A:
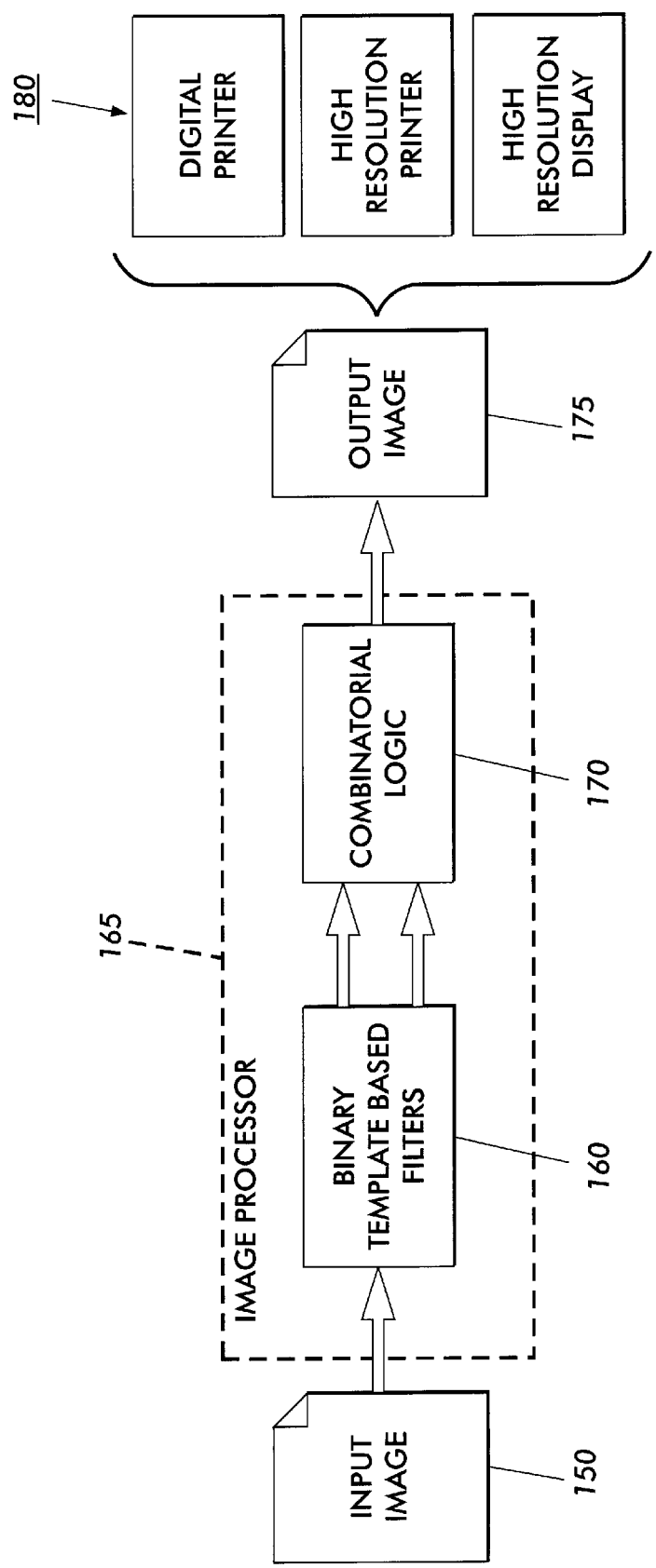
FIG. 5A shows a diagram of a system configuration using a template matching filter system according to the prior art.
Figure 5B:
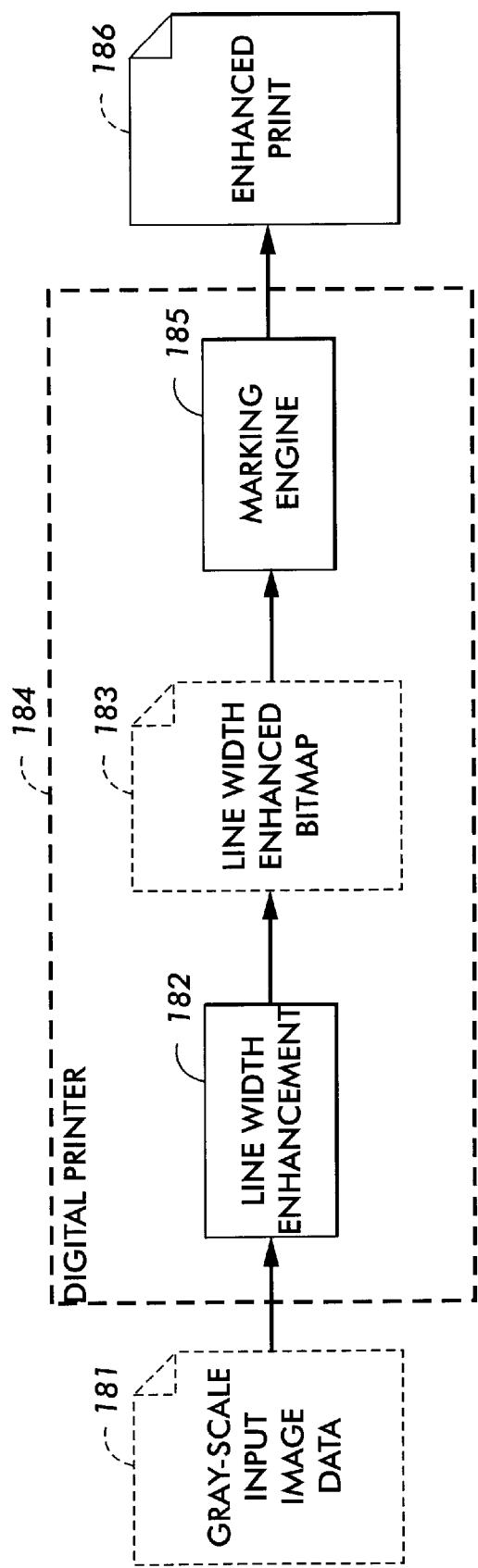
FIG. 5B shows another diagram of a system configuration using a template matching filter system of the present invention.

FIG. 5b shows gray-scale image data 181 inputted to a digital printer 184. The printer includes a line width enhancement circuit 182 and line width enhanced bitmap 183 output to a marking engine 185 to produce an enhanced printed 186. Line width enhancement in such a digital printer is typically performed for one or more of several possible reasons. One reason for the enhancement is compensation for marking process characteristics. For instance, a given marking process may not be able to print single pixel lines, and therefore it is desired to grow those lines in the digital image prior to printing to enable their representation on the final printed image. Another reason for line width enhancement is user preference, where a given user may prefer a particular darkness or thickness of character strokes, and an enhancement operation transforms the strokes from a received width to the preferred width.

Figure 6:
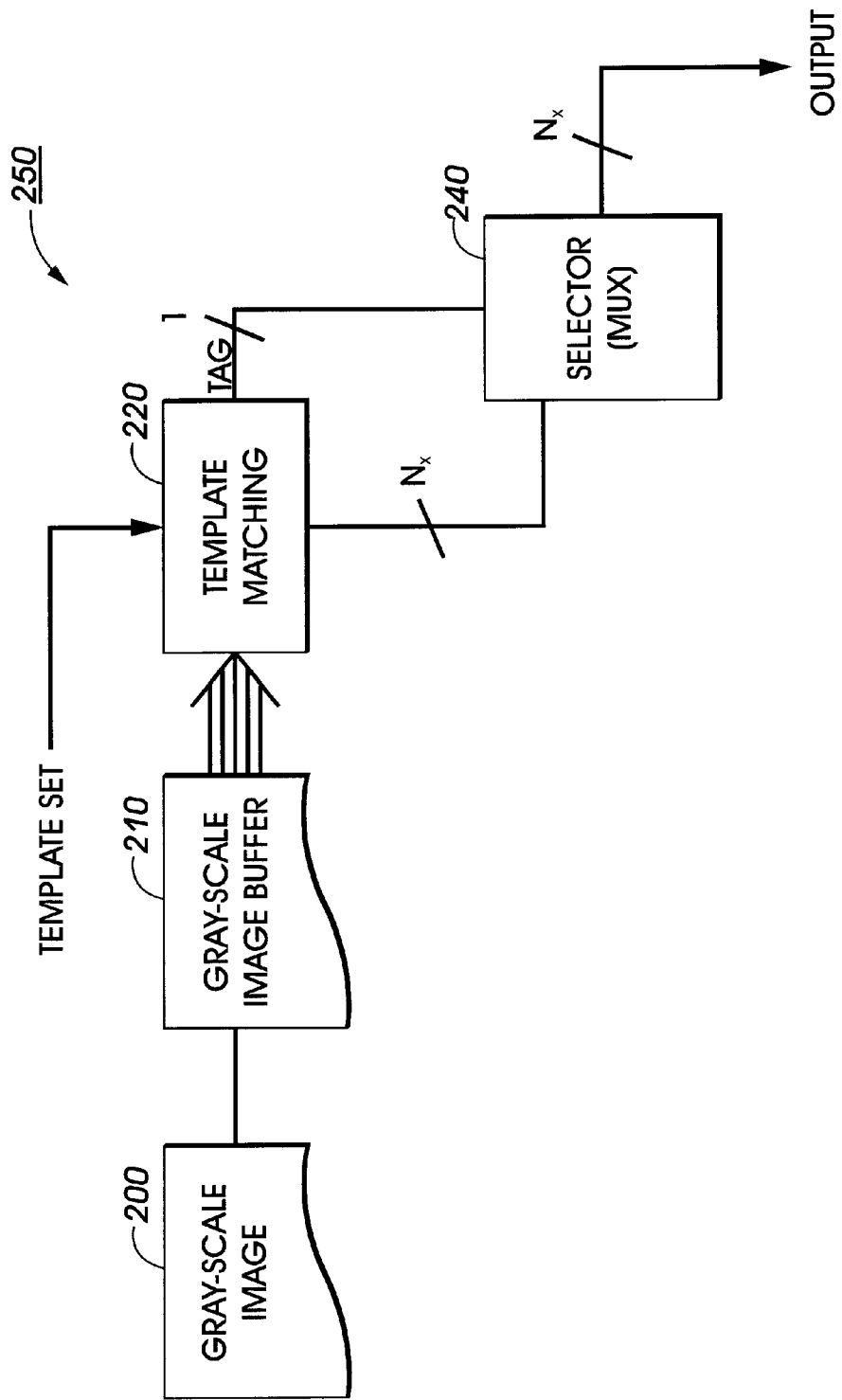
FIG. 6 is a diagram illustrating a gray-scale matching configuration in accordance with the present invention.

FIG. 6 shows one embodiment of a generalized functional block diagram of a loose-gray-scale template matching filter generation system 250 according to this invention. The template matching system 220 is connected to a template set and receives as input the gray-scale image 200 over a data buffer 210. The gray-scale image can also be received over a line signal or other link. The gray-scale image buffer provides a variety of image data to the loose-gray-scale template matching system 220.

In general the data source can be any one of a number of different data sources as an example such a source can be a scanner, digital copier, digital camera or any known device suitable for electronic source generation and/or storing or transmitting the electronic image. Further, the data source can be multiple devices hooked up serially or in parallel with the template matching system.

The data received from the data source is input to the loose-gray-scale template matching module, where one or more sets of templates are applied to the image. The signal output from the template matching block could be a match identifier, which could be passed onto a module for final signal selection, or the matching module itself could generate the final output signal by outputting the output signal associated with a matched template. The output signal could be a variety of forms such as a gray-scale pixel value, a binary pixel value, a group of binary of gray-scale pixel values, or an item of data describing the match condition.

Figure 7:
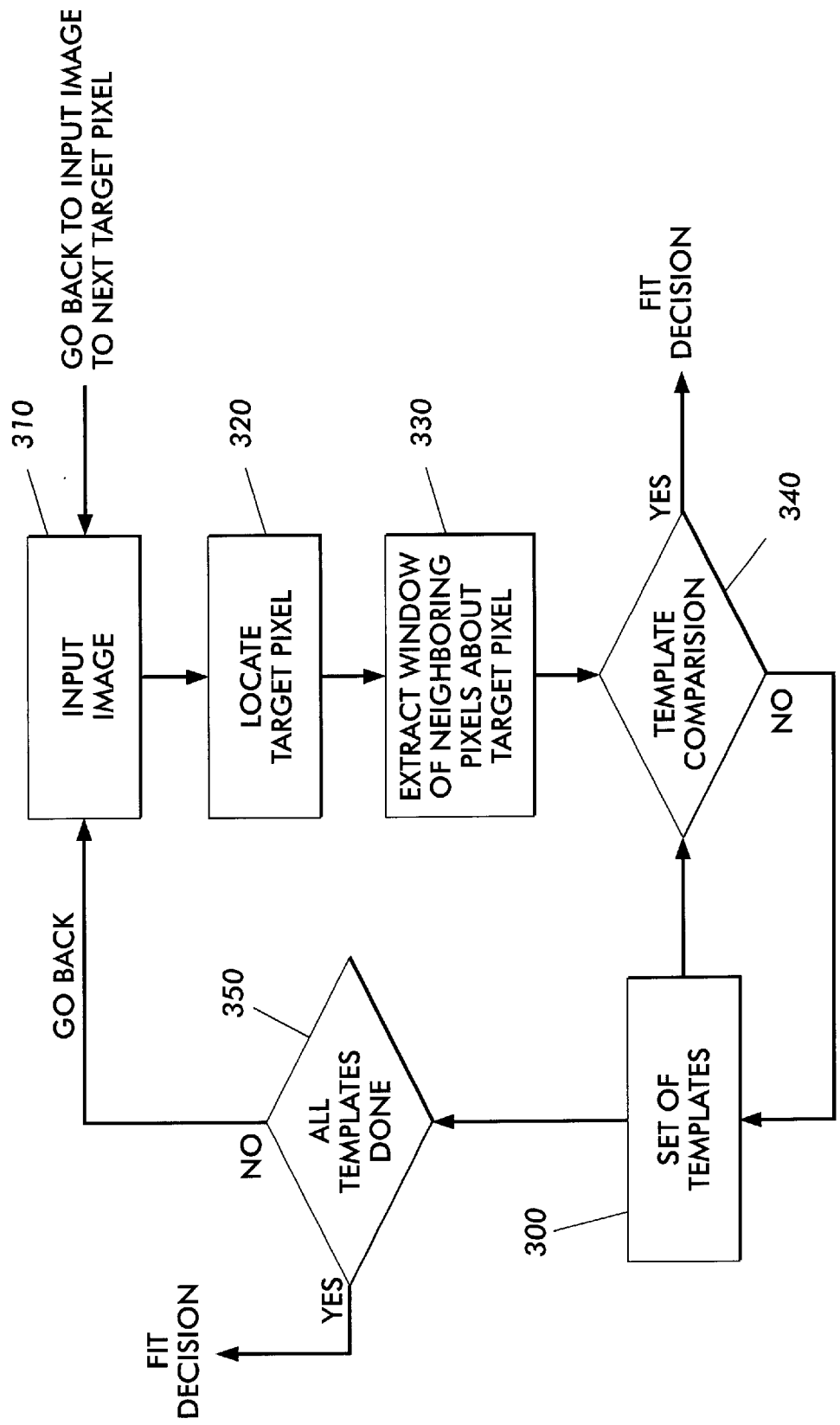
FIG. 7 is a flowchart illustrating a serial loose-gray-scale matching system in accordance with the present invention.

With reference to FIG. 7, a process for a serial implementation for matching multiple templates is shown. The loose-gray-scale template matching system includes an input image which is the output of a data source and a set of templates 300. The input image 310 is subsequently connected to locate target pixel circuit 320 for determining a target pixel. Surrounding the target pixel 330, a window is designated so as to extract a defined portion of the image about the target pixel 330. Such a window could be a 3×3, 4×4, 7×4 . . . , etc. type of matrix. Loose-gray-scale templates are stored in a template storage module 300. A template from the template storage module is input to the template comparison module 340. A loose-gray-scale template match is performed 340 on the defined portion of the image data. If a loose match occurs a fit decision is created. A fit decision could be a code that identifies the matching template, or it could be some resultant value, such as an output value or statistic of the image. If a loose match does not occur with the given template then the next template from the set of templates 300 is tested for a loose match, until there are no templates 350 to loosely match in the set 300. If none of the templates matched a different fit decision is defined, such as "do not change the value of the input image 310". An example of a fit decision is an address that could be used to access an output value stored in a look-up table. The address could be a digital value formed of several binary bits. If a fit does not occur the NO decision is passed back to the template storage module where another template may be accessed for a subsequent matching test. When all the templates are applied the image processing operation could return to the original image and extract a different neighborhood of observed pixels for further matching tests. Note that the matching tests could proceed until all templates are examined to create a collection of fit decisions, or the matching operation could have concluded upon obtaining a successful match. A process for a serial implementation for matching multiple templates is shown.

Mathematically equivalent matching processes could be employed in indirect matching operations, these would for example include match identifiers which represent a window of image data of the received image and match identifiers representing the templates and associated threshold looseness intervals.

Figure 8:
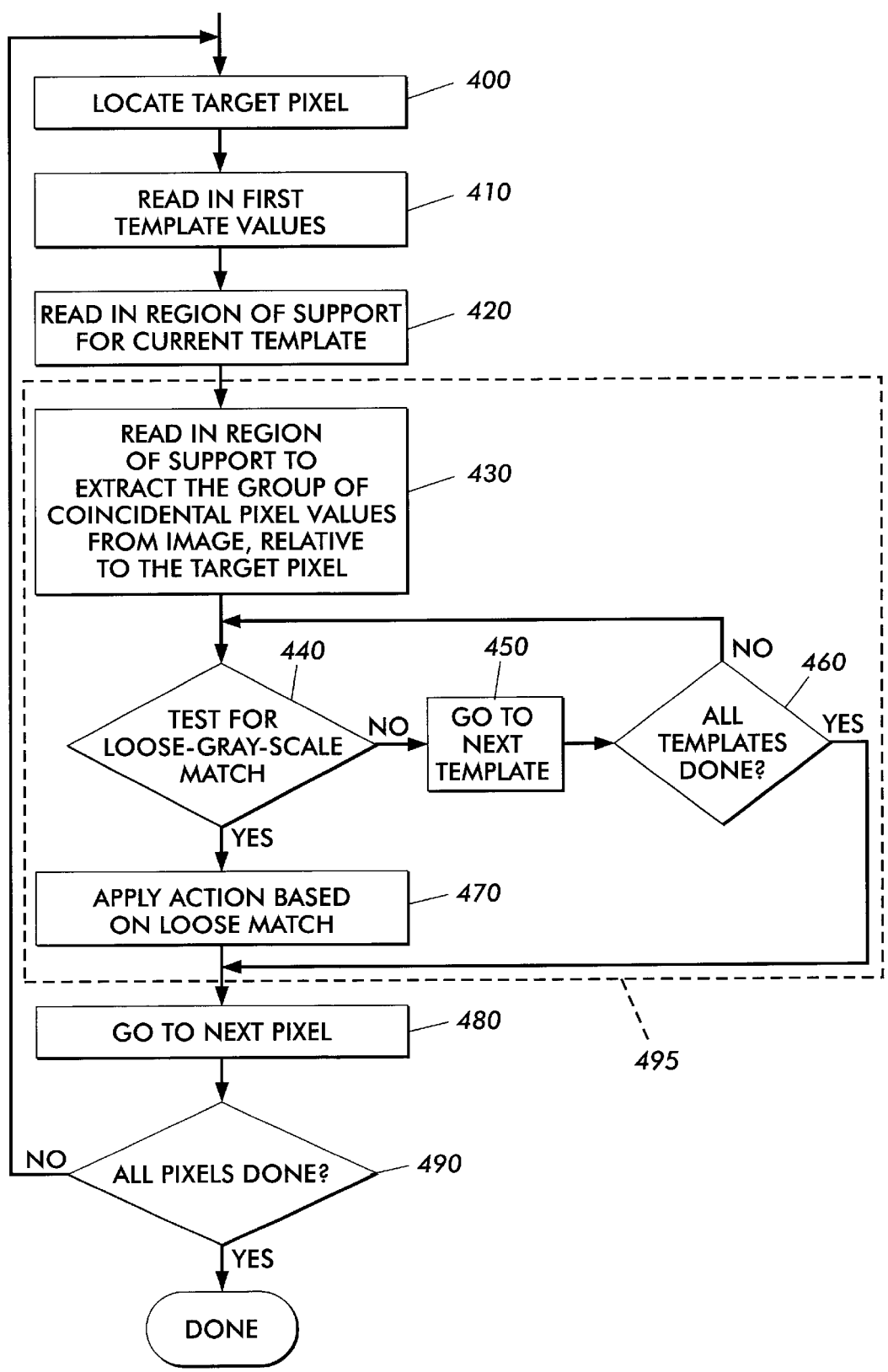
FIG. 8 is a detailed flowchart illustrating a serial test for loose-gray-scale template matching of a family of templates in accordance with the present invention.

FIG. 8 further teaches methods with a serial implementation of loose grayscale template matching. With reference to FIG. 8, in another embodiment of the present invention a serial loose-gray-scale template matching system is shown where first a target pixel is initialized 400. About the target pixel, a set of template values is read in 410 and a particular region of support for a current template is determined. Another way of looking at this concept is a set of templates is held in memory, and successive windowed neighborhoods are compared to the stored templates. From the region of support an extraction of the group of coincidental pixel values from the image relative to the target pixel is performed 430. A test for a loose-gray-scale template fit is performed 440 and if the result is NO then the sequence proceeds to the next template 450 until all the templates are tested 460. If the test of the loose-gray-scale match is YES then an action based on loose-gray-scale match is generated for the target pixel 470.

Figure 9:
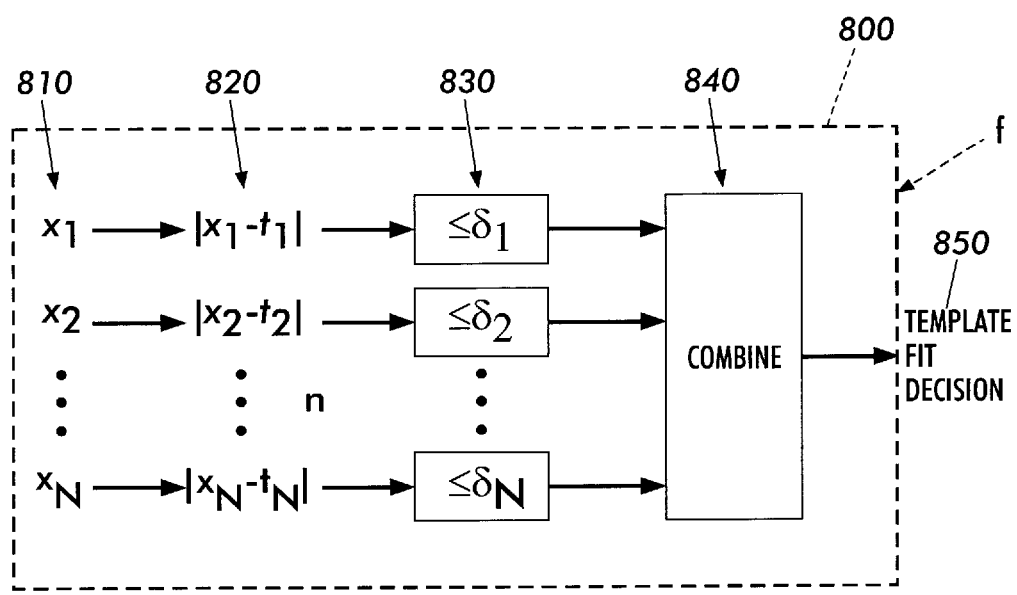
FIG. 9 is a flowchart illustrating a parallel test for a loose-gray-scale template match with one template in accordance with the present invention.

In reference to FIG. 9, there is shown an embodiment of a parallel test 800 functionally denoted by f for a single template T performing a matching operation using loose-gray-scale template matching according to the present invention. In particular, the present invention receives a series of input pixels ($x_1, x_2, \ldots, x_N$) 810 where N is the size of the neighborhood in number of pixels and applies a loose-gray-scale match.

Starting with the definition of loose-gray-scale template matching, several implementation and processing schemes using sets or multiple sets of templates will be described below.

For a single template T there is a loose match between the digital image in the observation window and the template when each pixel of the observation window, has an absolute value difference 820 between the image value at each pixel $x_i$ and the template value for each pixel $t_i$ that is less or equal 830 to the chosen looseness interval threshold $\delta_i$. The aforesaid absolute value difference in this embodiment is the looseness interval for each pixel in the window, and the limiting value for looseness acceptability for a match at each pixel is the looseness interval threshold. A loose-gray-scale template is composed of the template pixels values $t_i$ and the threshold intervals $\delta_i$, or a single threshold interval for the template In this embodiment we employ looseness intervals and looseness interval thresholds for each pixel in the window, and all, or some predefined number of looseness intervals must be less than the threshold looseness interval to define a loose match. The individual looseness interval decisions are evaluated in concert in combine block 840 to generate an overall fit decision 850.

The template fitting process may be formulated as shown in Eqs. 2 and 3 where it is chosen to define a loose fit as having all pixel looseness intervals possess values less than or equal to their respective looseness interval thresholds, $$f(x_1,x_2,\ldots,x_N;T) = f(x_1,x_2,\ldots,x_N; t_1,t_2,\ldots,t_N) = \min\{I_{(0..\delta i)}|x_i - t_i|; i=1,\ldots,N\} \quad (2)$$

where $$I_{(0,\delta i)}(u) = 1 \text{ if } 0 \leq u \leq \delta_i \text{ and } 0 \text{ otherwise} \quad (3)$$

and where I is called the characteristic function or indicator function and || is the absolute value.

We have expressed a loose-fitting template as a set of pixel values and corresponding threshold looseness intervals. There are alternative representations, such as two templates, one that specifies the lower bound that pixels may possess and the other template specifies the upper bound that pixels may possess to qualify as a loose-fitting match. That representation can be written as the following equation, $$f(x_1,x_2,\ldots,x_N;T) = f(x_1,x_2,\ldots,x_N;t_1,t_2,\ldots,t_N) = \min[I_{[ai,bi]}(x); i=1,\ldots,N] \quad (4)$$

where $$I_{[ai,bi]}(u) = 1 \text{ if } a_i <= u <= b_i \text{ and } 0 \text{ otherwise} \quad (5)$$

One advantage of this representation is that the threshold looseness interval is not limited to be symmetric about a central value.

There are other mathematical means to express the matching condition as described in Eqs. 2 and 3. One such equivalent form that we have found useful is provided in Eq. 6, $$f(x_1,x_2,\ldots,x_N;T) = f(x_1,x_2,\ldots,x_N;t_1,t_2,\ldots,t_N) = \min[I_{[di,si]}(x_i); i=1,\ldots,N] \quad (6)$$

Where $$s_i = t_i + \delta_i$$
$$d_i = t_i - \delta_i \quad (7)$$

Hence, there are a multitude of means to compute loose matches according to the loose-fitting criteria of the present invention. Another example is that loose matching could be determined by performing exact matching operations at lowered quantization, that is, an exact match using only the upper three bits of an eight bit pixel value is a loose match with respect to the pixel value at 8 bits. It is the intention of this patent to cover all such equivalent forms of the loose-fitting criteria.

Note that alternative looseness criteria may be applied. For instance, an overall template looseness interval may be computed by processing the individual pixel looseness intervals with an operation such as averaging a selected group, or taking their collective maximum value. That overall template looseness interval could then be compared to an overall threshold looseness interval to establish a match or no match condition.

Figure 10:
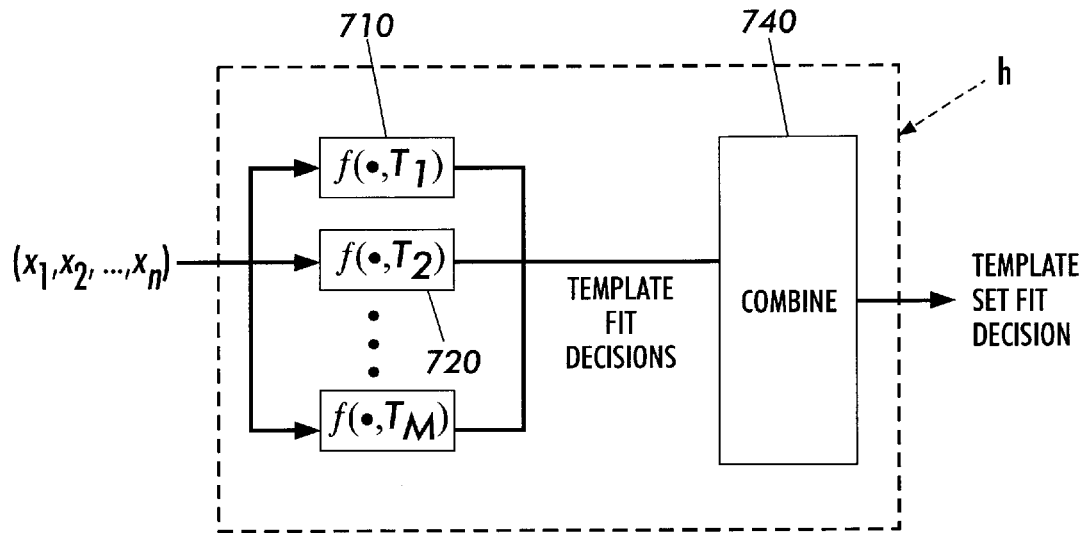
FIG. 10 is a diagram illustrating a parallel test for a family of templates performing matching operations using loose-gray-scale template matching in accordance with the present invention.

In FIG. 10, there is illustrated another embodiment of the present invention of a parallel test for loose-gray-scale template matching for a set of templates functionally denoted as h. Template matching filters will usually be composed of multitude of template, which refer to as the template set or a template family. Here, the values for each template are stored into memory as well as the corresponding threshold looseness intervals In the figure the template values are channeled simultaneously to the processing step where a looseness fit is ascertained for each template in parallel. A fit decision is generated for each loose match test and then the information is combined in a manner to reach an overall fit decision of whether a particular template loosely matched or not. By performing a parallel loose match operation more decision making steps can be performed in a shorter interval of time. Parallel implementation is a preferred embodiment in applications implemented in hardware, such as an Application Specific Integrated Circuit (ASIC), whereas serial implementations as shown in FIG. 7 are typically preferred for software implementations.

In a template-wise parallel implementation, for a collection of M templates, we can say that there M loose matching template operators $f(*, T_i)$ i=1, . . . , M, operating in parallel for a set of templates ($T_1, T_2, \ldots T_M$). The results of each individual template match decision are combined in a manner so as to generate the overall template set fit decision. FIG. 10 illustrates an embodiment of this template-parallel method where a serial input of digital image data is converted in parallel and combined to make the overall template fit decision. The combine block 740 can take a variety of forms. If the template fit decisions are disjoint, that is, only one template can loosely fit, the combine block can simply select the match decision that yielded a match. If the match decisions are not disjoint, the combine block must in some cases arbitrate between multiple matches. In this case we have found it beneficial to give priority to certain templates to allow the combine block to select a match of higher priority. Useful priority criteria have been based on template size (number of pixels) and threshold looseness intervals. A smaller threshold looseness interval would tend to indicate a more exact match and would be given priority in typical applications. Note that other related arbitration criteria fall within the scope of the present invention.

Figure 11:
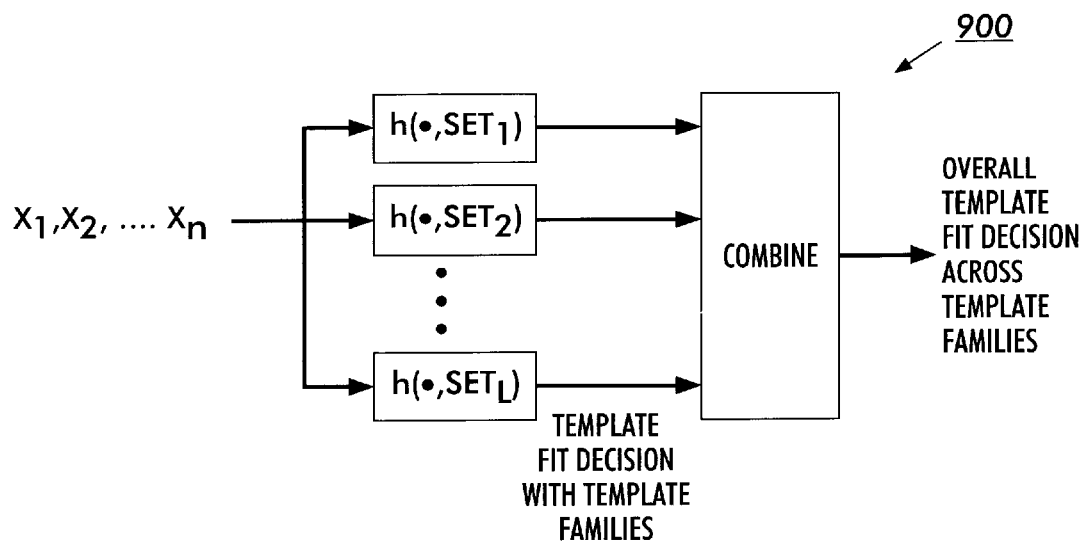
FIG. 11 is a diagram of multiple families of templates performing a template matching operation using loose-gray-scale template matching in accordance with the present invention.

Also, various templates may be grouped in sets wherein each set serves a particular processing task. Within each group, the templates may be arranged or a general arbitration procedure may be defined. The arbitration procedure may be a logical expression or a functional combination of the individual loose matching results. A family-parallel embodiment of this concept is shown in FIG. 11. In FIG. 11 the pixel values of the observed neighborhood are inputted to multiple parallel matching channels, where each will apply a filter defined by a family, or set, where matching with a set of templates is shown in FIG. 10.

It should be noted that templates sets and threshold looseness intervals could be modified during the processing of an image. For instance, tag information indicating image type could select a particular set of templates to be applied to that image type, or select a threshold looseness interval that is suitable for that image type. Further, prior processing history could be incorporated into loose-gray-scale template matching. For instance, although it has been described to utilize window pixel values solely from the observed image, recursive methods could be employed where the window of pixels applied to the matching operations could contain some mix of observed pixels values and recently processed pixel values. The above discussion simplifies the teaching of the general method by referring to either of these windowing methods as extracting observed pixels.

Further, pending U.S. patent application Ser. No. 09/222,919, filed Dec. 30, 1998, describes a method of "vector template matching" where some observed values may be extracted from other dimensions. An example is the extraction of pixels values from multiple frames in a time sequence, multiple dimensions in a color space representation, and multiple dimensions in space. In the present invention, observed pixels may be extracted from such multi-dimensional sources.

In the present invention image re-sampling is performed using loose-gray-scale template matching. In prior art re-sampling an image is performed usually in one of two ways. For a binary image class, such as text, image re-sampling is performed using binary template matching filters. For typical gray-scale pictorial images, re-sampling is usually performed using an interpolation method such as linear, parabolic or cubic interpolation. For text and line art re-sampling the applications are usually a form of resolution enhancement or resolution conversion. One method for decreasing the cost and/or bandwidth of a system is to receive low resolution anti-aliased line art and interpolate it up to the resolution of interest. For instance, a Digital Front End (DFE) could produce anti-aliased text at 300 dpi and a re-sampling operation could transform that image to the resolution of the intended printer, say 1200×1200 dpi. As anti-aliased images become more readily available, this operation will become increasingly more important. Loose Gray Scale Template Matching is well suited for such a conversion. Similar to the binary resolution conversion scenario, such templates could be used to observe the data about a pixel and output a preferred interpolated signal. The present invention employs loose-gray-scale templates as applied to anti-aliased data.

For the present invention other gray-edged line art can be considered in the same class as anti-aliased image data from a DFE. For instance, physical processes such as document scanning produce gray-edged line art, which could be re-sampled by the same method. The loose-gray-scale templates are designed using statistical optimization processes wherein a pair or training images are employed to determine templates that optimally map from the input gray-scale image to the re-sampled image. In addition, expert knowledge of line art patterns and geometric modeling could also be used to design the templates.

For pictorials and other non line art images re-sampling is often performed when transferring the image from one display or print device to another. According to the present invention, this resolution conversion is performed using a loose-gray-scale template matching filter. Preferred edge and fine feature rendition can be obtained compared to interpolating using linear, parabolic, and cubic methods, because those methods often generate blurriness or ringing artifacts. Loose-gray-scale templates can be designed that fit key image structures, such as edges, and output a high resolution sampling of said edges.

According to the present invention, when re-sampling to a higher image sample resolution, a match with a loose-gray-scale template generates a match identifier that indicates new image data values for a given location of the pixel observation window. For non-integer conversion, area mapping may be performed. That is, the window target location is not determined by a single pixel, but by a group of pixels. Re-sampled pixels values are output for that group based on a particular match with a loose-gray-scale template.

A similar type of group mapping occurs for decimation, wherein re-sampling is done to a lower resolution. A group of input pixels are mapping to a smaller group of output pixels, where the output sample values are generated via a loose-gray-scale template match.

Re-sampling may be done anamorphically. For example, a scanner may produce images at 400×600 spots per inch, yet the preferred output device is 300×300. Templates may loosely fit a windowed observation in the 400×600 spots per inch image and produce an output area in the target 300×300 spot per inch image. Advantageously, resolutions of the input and output images, whether the resolutions are horizontal or vertical, need not be integer multiples or whole fractions of each other.

Re-sampling to lower resolutions is also used in pyramidal image encoders. It is known in the art that differences between a low resolution and higher resolution versions of an image can be stored to afford a high image compression ratio. Decoding is performed by successively combining high-resolution differences with a low resolution base image. To encode such an image, it is necessary to successively re-sample a high-resolution image into progressively lower resolution counterparts. This invention is also directed to this application.

In driving input devices such as desktop scanners from a host computer, it is desirable to select the final image resolution. The present invention can also be applied to those applications providing desired resolution conversion in the electronic hardware of the input device, such as a scanner, or in software within the device driver. The resolution conversion capability of this invention can also reside in an auxiliary image processing board on the host bus.

In summary, a method for resolution conversion for re-sampling anti-aliased images is disclosed which decreases bandwidth costs associated with anti-aliased line art and other costs associated with interpolating these images to a desired resolution. The present method first involving the receipt of an image which is comprised of bitmap data including at least a plurality of gray-scale pixel tiles that define the image. Then receiving the image data at a first resolution and extracting pixel tile information of the received image at a second resolution. The method has the step of next using loose gray scale template matching on each of the pixel tile information with at least one of a plurality of templates so as to generate pixel-wise looseness interval values there between. Then, outputting a portion of the enhanced pixel tile information wherein the enhanced pixel tile information is formed by a matching of a template with pixel-wise looseness values. Preferably, the input and output resolutions are at different integer values and the first and second resolutions have a non-integer ratio. The input image can also preferably be comprised of gray halftones and the output enhanced pixel tile can be formed of binary pixel data.

Although the present invention has been described and illustrated in detail above and through the Figures, it is intended that the spirit and scope of the invention be interpreted as including the foregoing by way of illustration, and that the same be limited only by the appended claims as interpreted in light of the foregoing and all other equivalents.

What is claimed is:

1. A method for resolution conversion for re-sampling anti-aliased images from an image source in order to decrease bandwidth costs associated with anti-aliased line art and associated with interpolating said images to a desired resolution, comprising:

(a) receiving an image comprised of bitmap of image data, the image data being at a first resolution;

(b) generating a first two-dimensional window, the first two-dimensional window having a plurality image data values, each image data value being associated with a pixel location in the first two-dimensional window;

(c) determining a representative gray scale value for the first two-dimensional window;

(d) determining, a plurality of looseness intervals, each looseness interval being a difference between the determined representative gray scale value of the first two-dimensional window and a target representative gray scale value, the target representative gray scale value being associated with one template of a plurality of templates;

(e) comparing the determined looseness intervals to a threshold looseness interval, the threshold looseness interval being a maximum allowable value for the determined looseness interval that indicates a loose match;

(f) determining, based upon the comparison between the determined looseness intervals and the threshold looseness interval, which template of the plurality of templates loosely matches the first two-dimensional window of image data values, the loosely matched template being a template wherein the determined looseness interval associated therewith is equal to a non-zero value and the threshold looseness interval is equal to a non-zero value, an exactly matched template being a template wherein the associated determined looseness interval is equal to a zero value and the threshold looseness interval is equal to a zero value; and (g) generating, based on the template loosely matched the first two-dimensional window of image data values, a second two-dimensional window of image data values, the second two-dimensional window of image data values having a second resolution, the first resolution being different from the second resolution.

2. The method as claimed in claim 1, wherein the second resolution is less than the first resolution.

3. The method as claimed in claim 1, wherein the second resolution is greater than the first resolution.

4. A method for converting image data of a first resolution to image data of a second resolution, comprising:

(a) receiving an image comprised of bitmap of image data, the image data being at a first resolution;

(b) generating a first two-dimensional window, the first two-dimensional window having a plurality image data values, each image data value being associated with a pixel location in the first two-dimensional window;

(c) determining, a plurality of sets of looseness intervals for the first two-dimensional window, each set of looseness intervals being associated with one template of a plurality of templates, each looseness interval being a difference between an image data value associated with a pixel location in the first two-dimensional window and a target value from a set of target values, the target value being associated with a corresponding pixel location from a template, the set of target gray scale values being associated with one template of a plurality of templates;

(d) comparing the determined sets of looseness intervals to a threshold looseness interval, the threshold looseness interval being a maximum allowable value for the determined sets of looseness interval that indicates a loose match;

(e) determining, based upon the comparison between the determined sets of looseness intervals and the threshold looseness interval, which template of the plurality of templates loosely matches the first two-dimensional window of image data values, the loosely matched template being a template wherein a portion of the determined looseness intervals associated therewith are equal to a non-zero value and the threshold looseness interval is equal to a non-zero value, an exactly matched template being a template wherein all the associated determined looseness intervals are equal to a zero value and the threshold looseness interval is equal to a zero value; and (f) generating, based on the template loosely matching the first two-dimensional window of image data values, a second two-dimensional window of image data values, the second two-dimensional window of image data values having a second resolution, the first resolution being different from the second resolution.

5. The method as claimed in claim 4, wherein the second resolution is less than the first resolution.

6. The method as claimed in claim 4, wherein the second resolution is greater than the first resolution.

7. A method as claimed in claim 4, wherein the template of the plurality of templates which matches the first two-dimensional window of image data values is determined by:

(c1) determining an average looseness interval value for each set of looseness intervals;

(d1) comparing each average looseness interval value with the threshold looseness interval; and (e1) selecting the template of the plurality of templates having an associated average looseness interval value closest to the threshold looseness interval as the template that loosely matches the first two-dimensional window of image data values, the loosely matched template being a template wherein a difference between the associated average looseness interval value and the threshold looseness interval is equal to a non-zero value, an exactly matched template being a template wherein a difference between the associated average looseness interval value and the threshold looseness interval is equal to a zero value.

8. The method as claimed in claim 4, wherein the template of the plurality of templates which matches the first two-dimensional window of image data values is determined by:

(d1) comparing each looseness interval of a set of looseness intervals with a looseness interval threshold value to determine a looseness interval number, the looseness interval number being equal to how many looseness intervals within the set of looseness intervals are less than the looseness interval threshold value; and (d2) selecting the template of the plurality of templates having a greatest associated looseness interval number as the template that loosely matches the first two-dimensional window of image data values.

* * * * *